Sept. 11, 1928.

E. A. GARLOCK 1,683,969

MACHINE FOR PASTING BATTERY GRIDS

Original Filed March 4, 1926   4 Sheets-Sheet 3

Inventor
E. A. Garlock
By Watson E. Coleman
Attorney

Sept. 11, 1928.

E. A. GARLOCK 1,683,969

MACHINE FOR PASTING BATTERY GRIDS

Original Filed March 4, 1926    4 Sheets-Sheet 4

Patented Sept. 11, 1928.

1,683,969

UNITED STATES PATENT OFFICE.

EDWARD A. GARLOCK, OF BALTIMORE, MARYLAND.

MACHINE FOR PASTING BATTERY GRIDS.

Application filed March 4, 1926, Serial No. 92,286. Renewed July 17, 1928.

This invention relates to pasting battery grids and the general object is to provide a machine by which paste, composed of oxide of lead and water or weak sulphuric acid, may be effectively, quickly and easily applied to the light lead battery grid now in general use and whereby this paste may be forced into all the interstices of the grid and into interlocking engagement with the bars thereof so as to prevent any danger of the paste falling out or becoming detached from the grid bars.

A further object is to provide a machine of this character with two opposed applying disks having grooves upon their confronting surfaces radiating in opposite directions and between which the grid, with paste roughly applied thereto, is fed.

A still further object is to provide ejector rolls acting, after the grid has been acted upon by the applying disks, to eject the finished grid, and in this connection to provide means whereby the finished grid may be discharged between two layers of paper, mechanism being provided whereby the paper is fed forward only when the grid is engaged by the ejector rolls.

Another object is to provide a grid support reciprocatable between the disks and preferably provide means whereby the grid support shall be automatically reciprocated one complete stroke, or in other words, whereby the grid support shall be shifted to carry the grid between the disks and to the ejecting rolls and then returned to its initial position to receive a new grid thereon.

Other objects have to do with the details of construction and arrangement of parts as hereinafter detailed.

My invention is illustrated in the accompanying drawings wherein:—

Figure 4 is a section on the line 4—4 of Figure 2;

Figure 9 is a fragmentary side elevation partly in section showing a slight modification of my mechanism.

Figure 1:
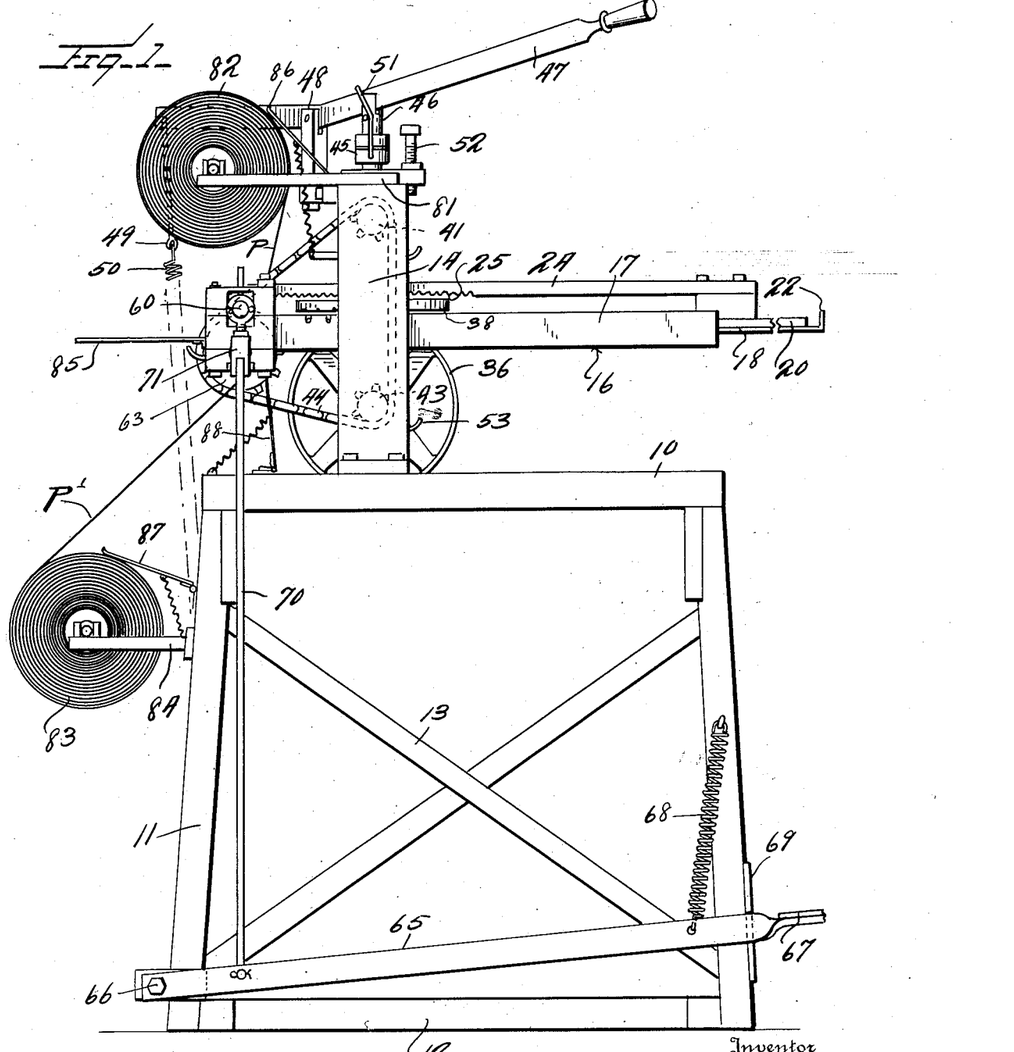
Figure 1 is a side elevation of a paste applying machine constructed in accordance with my invention.
Figures 2, 3:
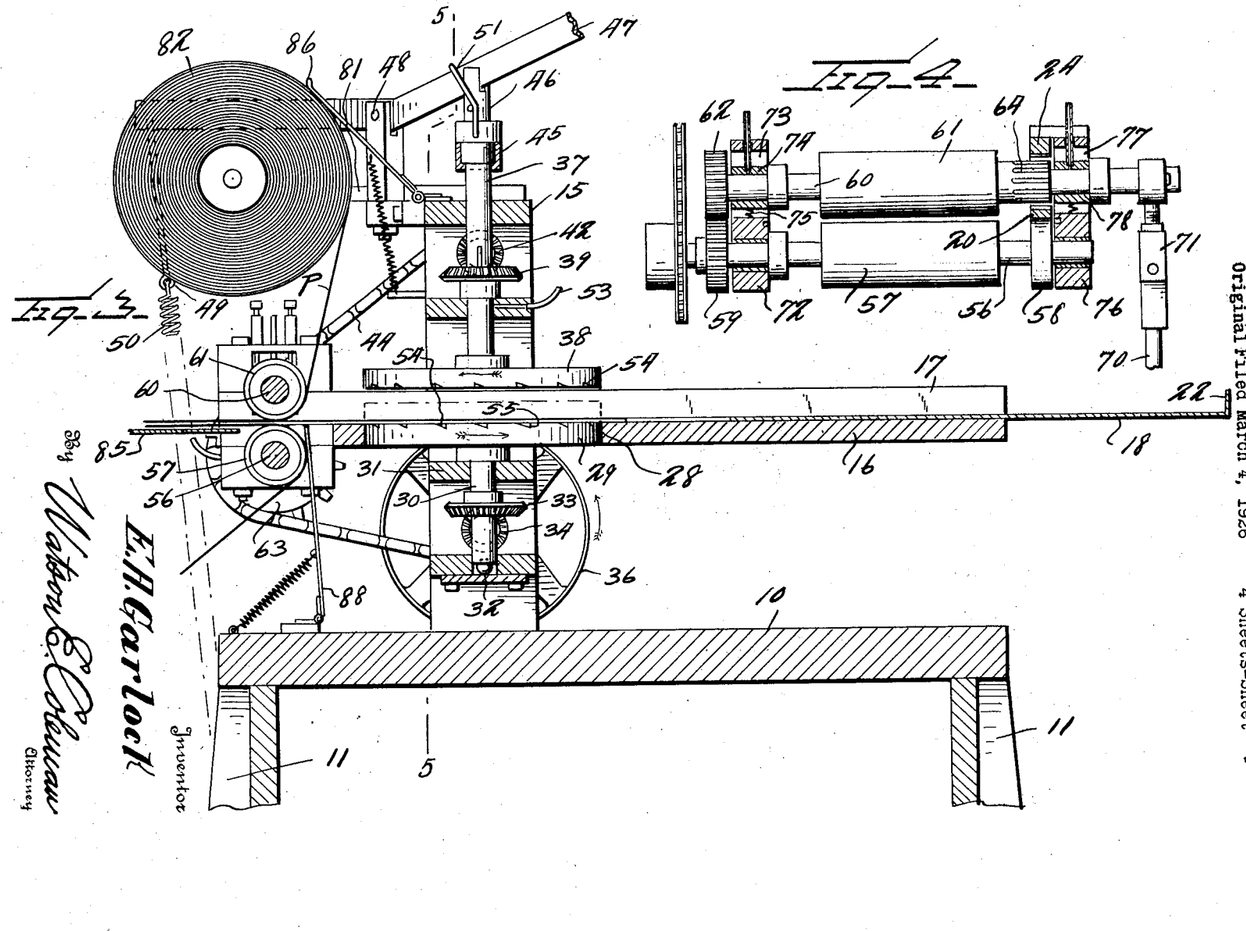
Figure 2 is a top plan view thereof.
Figure 3 is a section on the line 3—3 of Figure 2.
Figures 5, 6:
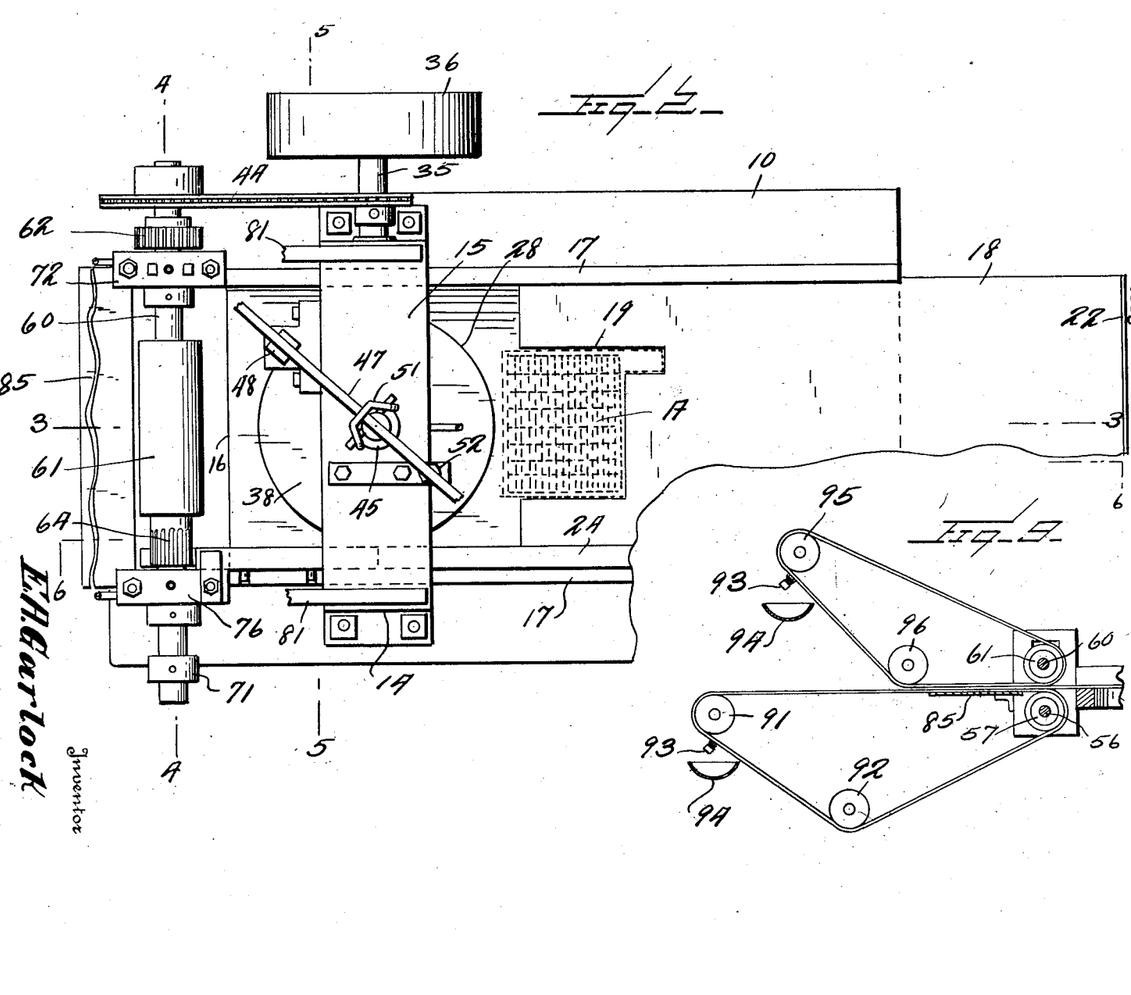
Figure 5 is a section on the line 5—5 of Figure 3.
Figure 6 is a section on the line 6—6 of Figure 2.
Figure 5:
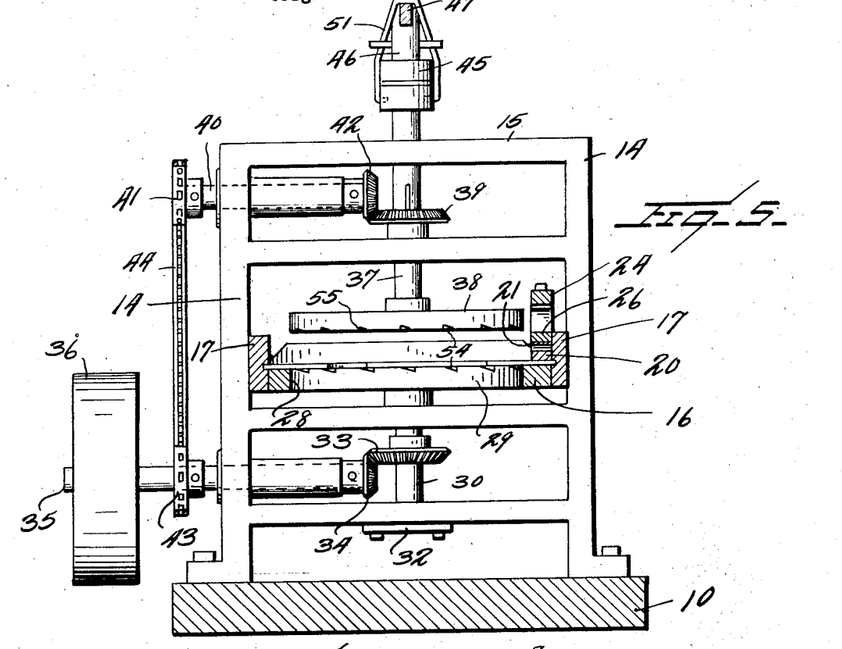

Referring to these drawings it will be seen that the pasting mechanism is mounted upon a supporting base or table 10 which has the downwardly extending supporting legs 11, suitably braced from each other by braces 12 and 13. Mounted upon the upper face of the supporting base 10 between the ends thereof, are the standards 14 connected at their upper ends by a cross-bar 15, and bolted at their lower ends to the table or platform 10. Mounted between the standards and extending forward and rearward thereof is the table 16. This table is provided with guides 17 and operating between these guides is the platen 18 of sheet metal, this platen being cut out at its forward end as at 19 to accommodate and receive the battery grid A, as illustrated in Figure 2. Mounted upon the platen 18 on one side edge thereof is a lower rack bar 20 which extends rearward beyond the platen and has it forwardly extending portion formed with the upwardly projecting teeth 21. The forward end of the platen extends beyond this rack bar and is upwardly angled as at 22 at its corners.

Mounted upon the rack bar 20 adjacent the forward end thereof is a block 23, and mounted upon this block is the upper rack bar 24 having teeth 25 confronting the teeth 21. Mounted upon the side frames 16ª of the table are the supporting members 26 which support a sheet metal dust guard 27 which extends over the lower rack teeth. The table 16 adjacent its forward end, is cut away as at 28, to provide a circular opening within which operates the lower disk 29. This lower disk is mounted upon a vertical shaft 30 extending downward through suitable bearings 31 and bearing at its lower end against a thrust bearing 32. This shaft 30 carries upon it the beveled gear wheel 33 engaged by a beveled gear wheel 34 mounted upon a transverse shaft 35 which extends out through the supports 14 and carries the band wheel 36 whereby power is applied to rotate this lower disk 29.

Disposed in suitable bearings in the cross portion 15$^a$ of the supporting members 14 is a vertical shaft 37 aligning with the shaft 30 and carrying at its lower end the paste applying disk 38 confronting the disk 29. This shaft 37 is vertically shiftable in its bearings and through a beveled gear wheel 39 which has rotative engagement with the shaft 37 at all times. This beveled gear wheel 39 is driven by means of a transverse shaft 40 carrying at its end the sprocket wheel 41 and at its inner end the beveled gear wheel 42. The shaft 35 carries upon it a sprocket wheel 43 which is engaged with the sprocket wheel 41 by means of a sprocket chain 44. This sprocket chain also operates the paper feeding and ejecting rolls as will be later described.

In order to permit the depression and elevation of the shaft 37 and of the upper disk 38, I swivel the upper end of the shaft 37 to a head 45, which head 45 constitutes a thrust bearing and the stem 46 of this head is bifurcated for the reception of a lever 47, which is held in engagement with the stem and is pivoted upon a bracket 48 operatively mounted upon the cross-bar 15. The opposite end of this lever is connected by a link 49 to a spring 50 in turn connected to the frame of the machine so that this spring normally lifts the lever and lifts the shaft 37. A yoke 51 is provided engaging the swivel of this shaft and, therefore, holding the lever to the shaft so that when the lever rises, the shaft will rise and when the lever is depressed the shaft will be depressed. The bolt 52 is mounted upon a projecting portion of the cross-bar 15 and this bolt constitutes an adjustable stop for limiting the movement of the lever 47 under depression. This bolt may obviously be adjusted so as to project it to a greater or less extent. The bearings for the shafts 30 and 37 are provided with suitable lubricating ducts 53 whereby oil may be applied thereto.

Figures 6, 7, 8:
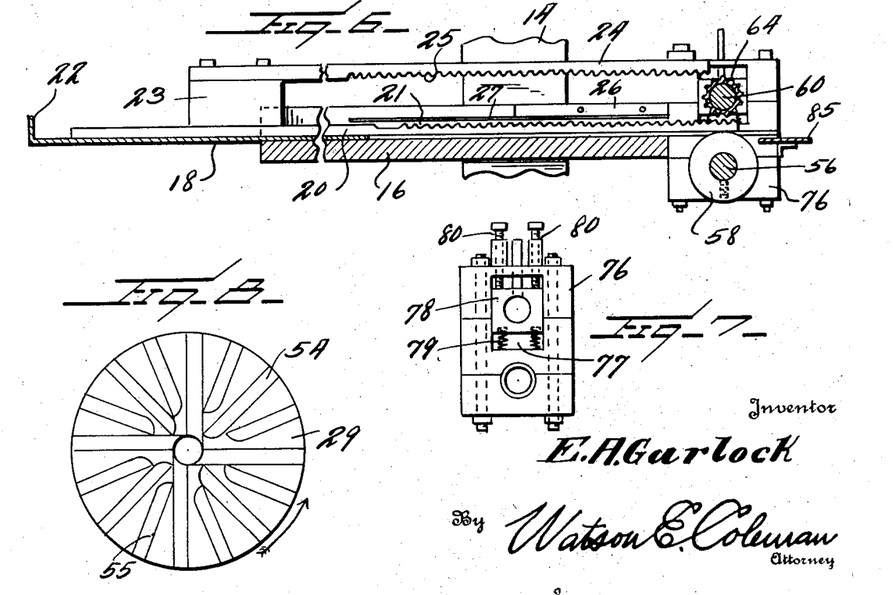
Figure 7 is an elevation of one of the bearings.
Figure 8 is a face view of the lower disk.

The confronting faces of the disks 29 and 38 are formed, as illustrated in Figure 8, with a plurality of radical grooves 54, these grooves having one wall extending vertically and the other wall extending at a slight angle to the face of the disk. The disks rotate in opposite directions and in the directions of the arrows in Figure 3, so that the perpendicular face 55 of each groove will be disposed in the direction of movement of the disk. The grid is fed into place and carried through between these disks and inasmuch as the disks operate in opposite directions, paste will be carried over the faces of the grid and forced into the interstices between the bars thereof so that this paste will be compacted into place and will entirely fill up each cell in the grid to the level of the faces of the grid bars.

The platen 18 moves to an extent which will carry the grid through between the disks and then the grid is gripped and carried out between ejecting rollers. These rollers comprise a lower roller shaft 56 having thereon the rubber or composition roller 57. Mounted upon this shaft 56 is a collar 58 which constitutes a support for the lower rack bar 20. Bearings for the lower roller may be of any suitable character and this roller shaft 56 carries upon it a gear wheel 59.

Disposed above the lower roller shaft is the upper roller shaft 60 having thereon the upper rubber roller 61, and carrying a gear wheel 62 which intermeshes with the gear wheel 59 on the lower shaft 56. The shaft 56 is driven by means of a sprocket wheel 63 mounted upon said shaft and from which the sprocket chain 44 passes. The shaft 60 for the upper roller 61 is formed at one end with the pinion 64 which is adapted to mesh with either of the racks 20 or 24. Normally this shaft with its pinion 64 is disposed in a neutral position midway between the racks 20 and 24, but this shaft 60 is so mounted that it may be shifted downward to bring it into engagement with the teeth 21 or raised to bring it into engagement with the teeth 25. When it is lowered into engagement with the rack teeth 21 the platen 18 will be fed forward to carry the grid into position between and through the paste applying disks, and when the shaft is raised it will cause a reverse movement of the platen and the return of the platen to its initial position.

For the purpose of raising and lowering the shaft I provide the lever 65 pivoted at 66 and extending to the front of the machine, and provided with the treadle 67. A spring 68 causes the elevation of the foot lever and the stop 69 is provided, against which the foot lever will rest which will limit its upward movement but when the lever is shifted sidewise a slight degree it will escape this stop and may be then elevated further by means of the spring 68. This lever 65 is connected by means of a link rod 70 to the projecting end of the upper roller shaft 60 by means of the coupling 71 to which the upper end of the link 60 is pivoted. When the foot lever is depressed against the action of the spring 68 the shaft 60 will be lowered to cause the forward feed of the platen and rack. When the pressure on the foot lever is released the shaft will move upward under the action of the spring 68 to carry the pinion into engagement with the upper rack to thereby reverse the motion of the platen and when the foot lever is engaged with the stop 69 the pinion 64 will be held in a neutral position.

The bearing designated generally 72 in Figure 4, may be made in any suitable manner which will permit the vertical movement of the shaft 60 and to this end the upper portion of the bearing, which bearing is formed of a plurality of sections, is formed with a vertically extending slot 73 within which is disposed the journal box 74 which can move vertically in the slot and is urged upward by springs 75. The opposite bearing 76 is likewise constructed in a plurality of sections and held together by bolts and is provided with a slot 77 within which is disposed the journal box 78, urged upward by springs 79, the upward movement of the journal box within the slot 77 being limited by stop screws 80. It will be understood that while the shafts 56 and 60 may thus relatively move away from each other yet the gear wheels 59 and 62 have teeth of sufficient depth so that the two gear wheels will never get out of mesh.

Mounted upon supporting brackets 81 in turn carried by the cross-bar 15 is the paper roll 82. This roll of paper P extends downward and beneath the upper rubber roller 61. The lower paper roll 83 is mounted upon brackets 84 attached to the legs 11 or mounted in any suitable manner and the paper P' from this roll 83 extends upward and over the lower roller 58, two sheets of paper thus being forced outward over a table 85. When the rollers 58 and 61 are forced into engagement with each other they bind upon the paper and cause the paper to feed outward but when the upper roller is raised out of parallelism with the lower roller the paper will not be frictionally engaged by these rollers and, therefore, no paper will be fed out of the machine. A blade 86 is hingedly mounted upon the cross-bar 15 and bears against the upper roll of paper and is urged against this paper by means of a spring. A like blade 87 is hingedly mounted upon the rear pair of legs and bears against the roll of paper 83. These blades simply act to keep the paper rolls from overrunning and keep the paper sheets in taut condition at all times. A doctor blade or scraper 88 is hingedly mounted upon the base 10 and extends upward and bears against the roll 58 and against one face of the grid as it is drawn into place between the upper and lower rollers 58 and 61, thus scraping foreign matter from the under face of the grid and scraping off any projecting products which might adhere thereto.

In the operation of forming a battery grid in this machine the operator places the battery grid upon the platen 18 in the recess 19 and applies to the battery grid a predetermined amount of paste. He then depresses the treadle 65 which draws the shaft 60 of the upper roller downward and carries the pinion 64 into mesh with the teeth 21. This causes a movement of the rack in a direction to carry the platen 18 and the grid A into the space between the upper and lower disks 29 and 38. As soon as this occurs the operator draws downward on the lever 47 which forces the shaft 37 of the upper disk downward and causes this upper disk to bear firmly against the upper face of the grid while the lower grid, of course, bears against the under face of the grid. The grid is now positively pushed through the space between the two disks, while at the same time the disks rotate in opposite directions to spread the paste material and force it into all the interstices of the grid. Meanwhile, the depression of the treadle 65 has brought the rubber rollers into contiguity so that when the forward edge of the grid strikes these rubber rollers, the forward edge of the grid will be gripped and the grid will be drawn forward between the rubber rollers and ejected with a sheet of paper on each face thereof. The paper will be pressed firmly against the opposite faces of the grid by the rubber rollers and this pressure will act to compact the paste and force it firmly into place between the bars of the grid.

While it is possible to cut off the paper from the sheet on each side of the grid after the grid has been pasted upon the table 85, yet ordinarily the operator simply folds and refolds the grids and the paper sheets one upon another until a sufficient number have been made. Then the grids with the paper sheets are removed. As soon as the operator releases the lever 47, the spring 50 will act to return the lever to its initial position and lift the shaft 37 and as soon as the operator releases pressure upon the treadle 67 the spring 68 will cause the lifting of the lever 65 and this lifts up on the free end of the shaft 60, separating the rubber rollers from each other and at the same time, shifting the pinion 64 from engagement with the lower rack 20 into engagement with the upper rack 24 which causes a reverse movement of the platen 18 and then returns to its initial position to receive another grid and the operation is completed.

If it be desired to remove the platen from the machine for cleaning, the foot lever is placed in a neutral position where the pinion will not engage either one of the racks and then the platen may be readily drawn from between the guides 17. It will be noted that the rack bar 24 is shorter than the rack bar 20 so that the pinion 64 may escape from engagement with the teeth 25 when the platen has been returned to its initial position.

This machine in practice has been found to work very effectively. It is simple, easily handled and turns out battery grids of a standard character and of uniform structure. Plates are completed much more quickly than they are by hand and it does away with the necessity of hand rolling and pressing in order to make the paste entirely fill the cells between the bars of the grid. Other embodiments of the machine may be constructed upon the same principles as these and the positive feed of the platen might be omitted and the platen simply pushed by hand to carry the grid into place between the rotating disks and into engagement with the ejecting rollers.

It will be understood that the purpose of the paper fed from the rolls 82 and 83 is to prevent the paste in the filled battery grid from sticking to the pressing rolls 57 and 61. The paper has a blotting action and takes up the moisture from the completed grid. In Figure 9 I have illustrated a slightly modified form of my invention wherein, in place of the paper rolls 82 and 83 I have provided an upper belt 89 and the lower belt 90 of canvas. These belts are endless and the upper belt passes around the lower feed roll 61, extends horizontally and then around the roller 91 and then downward around the roller 92, and then back to the feed roller 61. A scraper 93 engages the outer face of the belt after it has passed around the roller 91, this scraper being preferably in the form of a brush and discharging the material into a trough 94. The upper belt 89 passes around the upper feed roller 61, then upward and outward over a roller 95, then downward and beneath a roller 96 and back to the feed roller 61. Thus the horizontal flight of the upper belt is shorter than the horizontal flight of the lower belt so as to permit the removal of the completed grid. A brush and trough 93 and 94 are also provided for the upper belt. These belts act to absorb the moisture from the faces of the completed grid and perform the same function as the paper covering. Figure 9 is designed to show that other means might be used than the paper rolls for receiving the completed grid after it has been pressed.

While I have illustrated certain details of construction and arrangement of parts which I have found to be particularly effective in actual practice I do not wish to be limited thereto as it is obvious that many changes might be made therein without departing from the spirit of the invention as defined in the appended claims.

I claim:—

1. A battery grid pasting machine including two opposed imperforate disks, the confronting faces of the disks being provided with grooves opening upon the circumferential face of the disk, means for rotating the disks in opposite directions, and means for feeding a battery grid between said disks.

2. A battery grid pasting machine including two opposed disks having their confronting faces formed with radial grooves opening upon the circumferential face of the disk, each groove having a wall perpendicular to the face of the grid and an inclined wall, means for rotating the disks in opposite directions, and means for feeding a grid into place between said disks and through the space between said disks.

3. A battery grid pasting machine including two opposed disks, one of said disks being movable toward the other, the faces of the disks being radially grooved, means for feeding a battery grid and paste through the space between said disks, means for rotating the disks in opposite directions, and means for shifting one of said disks toward the other disk.

4. A battery grid pasting machine including upper and lower disks, the confronting faces of the disks being formed with radial grooves, means for rotating said disks in opposite directions, means for depressing the upper disk toward the lower disk, and means for carrying a battery grid into place between said disks and out of such position.

5. A battery grid pasting machine including two opposed disks having their confronting faces grooved, means for rotating said disks in opposite directions, means for shifting one of said disks toward or from the other disk, a pair of rolls disposed in advance of the disks, and rotating in opposite directions, and means for feeding a battery grid having paste applied thereto into and through the space between said disks and into engagement with said rolls.

6. A battery grid pasting machine including two opposed disks having their confronting faces radially grooved, means for rotating said disks in opposite directions, means whereby one of said disks may be shifted toward or from the other disk, a pair of rolls disposed in advance of said disks, means for rotating said rolls in opposite directions, means for feeding two sheets of paper through said rolls, and means for carrying a battery grid with paste applied thereto through the space between said disks into engagement between and with the sheets of paper as they travel over said rolls.

7. A battery grid pasting machine including two opposed disks having their confronting faces radially grooved, means for driving said disks in opposite directions, means for shifting one of said disks toward the other disk, a pair of rolls of yielding material disposed in advance of said disks, means for rotating said rolls in opposite directions, means for feeding two sheets of paper between the respective rolls, means for carrying a battery grid with paste applied thereto through the space between the disks and into engagement between and with the paper as it passes through the rolls, and means for operatively engaging the rolls with said paper to cause the feeding of the paper when a grid is forced into engagement with the paper and between said rolls.

8. A machine for pasting battery grids including opposed paste distributors, a pair of rolls of yielding material mounted in advance of the distributors, said rolls being so mounted that they may be shifted toward or from each other, means for continuously driving said rolls in opposite directions, means for feeding sheets of paper against the rear face of the rolls and between the same, said rolls when approximately frictionally engaging the sheets to feed them forward but when moved apart releasing their frictional engagement upon the sheet, and means for feeding a battery grid between said distributors and into contact therewith and into engagement with said sheets of paper and between the rolls, means for shifting said rolls toward each other to grip the grid and the sheets of paper and feed the grid and sheets forward between and out of said rolls.

9. A battery grid pasting machine including upper and lower disks having grooved confronting faces, vertical shafts carrying said disks, power operated means for rotating said shafts in opposite directions, the shaft of the upper disk being mounted for vertical movement and simultaneous rotary movement, a lever operatively engaged with the upper shaft whereby the upper shaft may be depressed, a spring urging the lever and the upper shaft upward, and manually controlled means for carrying a battery grid with paste applied thereto between said disks.

10. A machine for applying paste to battery grids comprising upper and lower vertical shafts, power operated means for operating said shafts in opposite directions, a lever having a swiveled engagement with the upper shaft whereby the upper shaft may be shifted toward the lower shaft or shifted away therefrom, a spring urging the lever upward, adjustable means for limiting the downward movement of the lever, and means for carrying a grid into position between said disks.

11. A machine for pasting battery grids including upper and lower disks having their confronting faces grooved, means for simultaneously rotating said disks in opposite directions, manually operable means for shifting one of said disks toward the other disk while rotating, a table within which the fixed disk is mounted, a platen cut out to receive the battery plate and reciprocatable over the face of the table to carry the battery plate into position between said disks and out of such position, and means for reciprocating said platen.

12. A machine for pasting battery grids including upper and lower disks having their confronting faces grooved, means for simultaneously rotating said disks in opposite directions, manually operable means for shifting one of said disks toward the other disk while rotating, a table within which the fixed disk is mounted, a platen cut out to receive the battery plate and reciprocatable over the face of the table to carry the battery plate into position between said disks and out of such position, and manually controlled power actuated means for shifting the platen to carry the grid into position between said disks and then return the platen to its initial position.

13. A machine for pasting battery grids including upper and lower disks having their confronting faces grooved, means for simultaneously rotating said disks in opposite directions, manually operable means for shifting one of said disks toward the other disk while rotating, a table within which the fixed disk is mounted, a platen cut out to receive the battery plate and reciprocatable over the face of the table to carry the battery plate into position between said disks and out of such position, manually controlled power actuated means for shifting the platen to carry the grid into position between said disks and then return the platen to its initial position, and means for gripping the battery grid when in position between the disks and withdrawing said grid from between the disks and ejecting said grid.

14. A machine for pasting battery grids including upper and lower disks having their confronting faces grooved, means for simultaneously rotating said disks in opposite directions, manually operable means for shifting one of said disks toward the other disk while rotating, a table within which the fixed disk is mounted, a platen cut out to receive the battery plate and reciprocatable over the face of the table to carry the battery plate into position between said disks and out of such position, manually controlled power actuated means for shifting the platen to carry the grid into position between said disks and then return the platen to its initial position, and means for gripping the battery grid when in position between the disks and ejecting said grid comprising opposed rollers of yielding material.

15. A machine for pasting battery grids including upper and lower disks having their confronting faces grooved, means for simultaneously rotating said disks in opposite directions, manually operable means for shifting one of said disks toward the other disk while rotating, a table within which the fixed disk is mounted, a platen cut out to receive the battery plate and reciprocatable over the face of the table to carry the battery plate into position between said disks and out of such position, manually controlled power actuated means for shifting the platen to carry the grid into position between said disks and then return the platen to its initial position, and means for gripping the battery grid when in position between the disks and ejecting said grid comprising opposed rollers of yielding material, and means for feeding two sheets of paper between said rollers and on each side of said grid.

16. A machine for pasting battery grids including upper and lower disks having their confronting faces grooved, means for simultaneously rotating said disks in opposite directions, manually operable means for shifting one of said disks toward the other disk while rotating, a table within which the fixed disk is mounted, a platen cut out to receive the battery plate and reciprocatable over the face of the table to carry the battery plate into position between said disks and out of such position, manually controlled power actuated means for shifting the platen to carry the grid into position between said disks and then return the platen to its initial position, means for gripping the battery grid when in position between the disks and ejecting said grid comprising opposed rollers of yielding material, means for feeding two sheets of paper between said rollers and on each side of said grid comprising two paper rolls, the sheets of paper thereon being guided into position between said rolls.

17. A machine for pasting battery grids comprising a lower disk, a table surrounding the lower disk and having its face flush therewith, an upper disk confronting the lower disk, the confronting faces of said disks being radially grooved, power operated means for rotating said disks in opposite directions, manually controlled means for shifting the upper disk toward the lower disk, a platen operating over the table and having its forward end recessed to engage the side edges and rear end of a battery grid, and manually controlled power operated means for shifting the platen forward to carry the grid into position between said disks and carry the platen rearward to its initial position, and means for gripping the grid when in place between the disks and withdrawing the grid therefrom and ejecting the same.

18. A machine for pasting battery grids including paste distributing means, means for feeding a battery grid and paste into operative relation to the paste distributing means, means for withdrawing the battery grid from between the paste distributing means and exerting pressure on each side thereof, and means for applying sheets of paper against each face of the battery grid as it is ejected.

19. A machine for pasting battery grids including opposed paste distributors, and means for carrying a battery grid into place between said distributors including a table upon which the grid rests, a platen shiftable over the face of the table and having a recess to receive one end portion of the battery grid, the platen having upper and lower racks, a power operated shaft having a pinion, and manually controlled means for shifting said pinion into engagement with one of said racks to thereby carry the platen forward and the grid into position between said distributors and then shifting the pinion into position with the other rack to cause reverse movement of the platen.

20. A machine for pasting battery grids comprising a table, a lower paste distributor having its upper face flush with the upper face of the table, an upper paste distributor confronting the first named distributor and shiftable toward or from the same, power operated means for rotating said distributors in opposite directions, and manually operable means for shifting the distributors toward or from each other, a platen movable over the face of the table and having a recess at one end to receive a major portion of a battery grid, upper and lower racks mounted upon said platen and extending in advance of the forward edge thereof, a power operated pinion, manually operable means for shifting the pinion into engagement with one of said racks to cause the advance of the platen or into engagement with the other rack to cause the retraction of the platen, and means in advance of the distributors gripping the grid when it is pushed into place between the distributors by said platen and ejecting said grid.

21. A machine for pasting battery grids comprising a table, a lower paste distributor having its upper face flush with the upper face of the table, an upper paste distributor confronting the first named distributor and shiftable toward or from the same, power operated means for rotating said distributors in opposite directions, and manually operable means for shifting the distributors toward or from each other, a platen movable over the face of the table and having a recess at one end to receive a major portion of a battery grid, upper and lower racks mounted upon said platen and extending in advance of the forward edge thereof, a power operated pinion, manually operable means for shifting the pinion into engagement with one of said racks to cause the advance of the platen or into engagement with the other rack to cause the retraction of the platen, and means in advance of the distributors gripping the grid when it is pushed into place between the distributors and ejecting said grid including two opposed rolls of yielding material.

22. A battery grid pasting machine comprising a table, a lower distributor mounted on the table with its upper face flush therewith, an upper distributor, power operated means for rotating said distributors in opposite directions, manually controlled means for shifting the upper distributor toward the lower distributor, a platen movable over the face of the table and having one end thereof recessed to receive a major portion of a grid, said grid being supported upon the table, upper and lower racks carried by said platen and extending in advance thereof, upper and lower ejecting rolls mounted in advance of the distributors, the lower roll being disposed in alignment with the table, the upper roll having a shaft and movable toward or from the lower roll, a pinion mounted upon the shaft and movable with the shaft into or out of engagement with either of said racks, power operated means for rotating said ejecting rolls, and manually controlled means for shifting the shaft of the upper roll to carry the pinion into engagement with either of said racks.

23. A battery grid pasting machine comprising a table, a lower distributor mounted on the table with its upper face flush therewith, an upper distributor, power operated means for rotating said distributors in opposite directions, manually controlled means for shifting the upper distributor toward the lower distributor, a platen movable over the face of the table and having one end thereof recessed to receive a major portion of a grid, said grid being supported upon the table, upper and lower racks carried by said platen and extending in advance thereof, upper and lower ejecting rolls mounted in advance of the distributors, the lower roll being disposed in alignment with the table, the upper roll having a shaft and carrying a pinion, bearings for said upper shaft including vertically movable journal boxes, springs urging the journal boxes in a direction to separate the rolls and carry the pinion into engagement with the upper rack, and a treadle operatively engaged with the upper shaft and movable to shift said shaft into a position where the pinion is in engagement with the lower rack or into an intermediate position between said racks.

24. A battery grid pasting machine comprising a table, a lower distributor mounted on the table with its upper face flush therewith, an upper distributor, power operated means for rotating said distributors in opposite directions, manually controlled means for shifting the upper distributor toward the lower distributor, a platen movable over the face of the table and having one end thereof recessed to receive a major portion of a grid, said grid being supported upon the table, upper and lower racks carried by said platen and extending in advance thereof, upper and lower ejecting rolls mounted in advance of the distributors, the lower roll being disclosed in alignment with the table, the upper roll having a shaft and carrying a pinion, bearings for said upper shaft including vertically movable journal boxes, springs urging the journal boxes in a direction to separate the rolls and carry the pinion into engagement with the upper rack, a treadle operatively engaged with the upper shaft and movable to shift said shaft into a position where the pinion is in engagement with the lower rack or into an intermediate position between said racks, upper and lower rolls, the paper from which is adapted to be disposed to extend down behind and between said rolls and be frictionally engaged thereby when the rolls are shifted toward each other and the pinion is in engagement with the lower rack.

25. A battery grid pasting machine including a supporting frame, a table mounted thereon, a lower disk mounted for rotation in the table with its upper surface flush with the upper face of the table, an upper disk mounted above the table, the confronting faces of the disks being radially grooved, manually operable means for vertically shifting the upper disk toward the lower disk, a pair of ejecting rolls disposed in advance of the table, one of said rolls having a sprocket wheel, upper and lower horizontal shafts carrying sprocket wheels, a chain passing over said sprocket wheels, power operated means for driving one of said horizontal shafts, a platen longitudinally shiftable upon the table and having a recess to receive a major portion of a battery grid.

26. A battery grid pasting machine including a supporting frame, a table mounted thereon, a lower disk mounted for rotation in the table with its upper face flush with the upper face of the table, an upper disk mounted above the table, the confronting faces of the disks being radially grooved, manually operable means for vertically shifting the upper disk toward the lower disk, a pair of ejecting rolls disposed in advance of the table, one of said rolls having a sprocket wheel, upper and lower horizontal shafts carrying sprocket wheels, a chain passing over said sprocket wheels, power operated means for driving one of said horizontal shafts, a platen longitudinally shiftable upon the table and having a recess to receive a major portion of a battery grid.

and manually controlled means for causing the automatic movement of the platen from its initial position to carry a battery grid into position between said disks and with its edge in engagement between said ejecting rollers and a return movement to its initial position.

27. A battery grid pasting machine including paste distributors, means for feeding a battery grid with paste thereon between said distributors, pressing rollers between which the grid with its distributed paste is carried, and means for applying absorbent material on each side of the completed grid.

In testimony whereof I hereunto affix my signature.

EDWARD A. GARLOCK.